United States Patent Office 3,036,122
Patented May 22, 1962

3,036,122
PREPARATION OF AROMATIC
CARBOXYLIC ACIDS
Alan E. Ardis, Hamden, Frank L. Nasti, North Haven, and Alexander A. Vaitekunas, New Haven, Conn., assignors to Olin Mathieson Chemical Corporation, New Haven, Conn., a corporation of Virginia
No Drawing. Filed Sept. 3, 1957, Ser. No. 681,448
5 Claims. (Cl. 260—524)

This invention relates to an improved process for the catalytic oxidation in liquid phase of aromatic compounds in which the aryl group has at least one methyl nuclear substituent, and is particularly adapted to the rapid and efficient conversion of suitable methyl-substituted benzenes to aromatic dibasic acids.

Earlier studies in this field have resulted in the proposal of various processes for the catalytic oxidation of alkylated aromatic compounds in the liquid phase in the presence or absence of solvent by means of air or oxygen using various metals or salts as catalyst and a variety of organic compounds, such as peroxides, aldehydes, and ketones as reaction initiators or activators.

In general, these proposals of the prior art involve serious disadvantages, including lengthy reaction periods of many hours or even days, conversion of only a small fraction, usually much less than half, of the starting material even after lengthy reaction periods; the simultaneous formation of other oxidized products, the removal of which is difficult and requires additional steps and expense; the requirement for reaction conditions involving high temperatures, high pressures or extremely corrosive reagents; and the use of additional reagents which increases the cost of production. Where the desired product was a dibasic acid, the procedure generally involved successive steps, as for example, first the conversion of xylene to toluic acid and then the oxidation of the latter under more drastic conditions to the corresponding phthalic acid.

Accordingly, it is the main object of this invention to provide a process for the catalytic oxidation in solution of methyl-substituted aromatic compounds to form the desired aromatic acid in a very short time by a single step. Further objects include the provision of such a process which is very rapid and also results in high yields of excellent product; which yields directly products of high purity or having a small content of readily separable impurities; and which involves reaction conditions that are operable at low cost and readily controlled.

The above and other objects are accomplished in accordance with this invention by carrying out the oxidation as described hereinafter whereby excellent product can be obtained at high yields in reaction times as short as several minutes as contrasted with days or hours in accordance with prior proposals.

The very rapid and extremely effective oxidation process of this invention depends upon a novel combination of reaction conditions and features. Generally stated, a dilute solution of methyl-aromatic compound in acetic, propionic or butyric acid, containing water within a narrow range of concentrations, a methylenic ketone activator, and as catalyst a cobalt salt of acetic, propionic or butyric acid is treated with a gas containing molecular oxygen under suitable conditions of temperature and pressure so that oxygen is absorbed very rapidly, accompanied by a very fast exothermic oxidation reaction yielding the desired product. The reaction is allowed to proceed generally for only a few mintes and at most for not more than about an hour or two, being preferably terminated before all the readily reactive methyl groups have been oxidized. This results not only in the efficient and rapid oxidation of the starting material to the desired aromatic carboxylic acid, but also in preserving a substantial portion of the ketone activator in the reaction mixture which after suitable treatment can be recycled in the oxidation reaction.

The process of this invention is advantageous for the oxidation of aromatic compounds having one or more methyl groups substituted in the aromatic nucleus, resulting in the formation of aromatic carboxylic acid by conversion of methyl groups to carboxyl. Typical starting materials are methyl-substituted benzenes such as toluene, m-xylene, p-xylene, or mixtures containing such compounds. The methyl-aromatic starting material may contain, in addition to methyl, other nuclear substituents inert to the oxidation reaction, such as chlorine, bromine, fluorine, nitro, carboxyl, alkoxy, aryloxy, or tertiary alkyl groups. Treatment in accordance with the reaction conditions prescribed in accordance with this invention results in the efficient production within a few minutes of the desired aromatic acid by the oxidation of nuclear methyl to carboxyl. Typical conversions include toluene to benzoic acid, m-xylene or m-toluic acid to isophthalic acid, p-xylene or p-toluic acid to terephthalic acid, 1,4-dimethyl-2-chlorobenzene to chloroterephthalic acid, and 1,4-dimethyl-2-nitrobenzene to nitroterephthalic acid.

It has been found that the obtainment of such outstandingly rapid and efficient oxidation requires the provision of reaction conditions and compositions essentially as defined below.

The methyl-aromatic compound is provided in the form of a dilute solution in a solvent consisting essentially of acetic, propionic, or butyric acid or a mixture containing at least two of said acids. While an inert diluent such as benzene or chlorobenzene may be added to the lower fatty acid solvent in minor proportion, such addition is generally not preferred. By dilute solution, reference is had to compositions wherein the methyl-aromatic compound is present in an amount of 2 to 20%, preferably 7 to 12%, by weight of the fatty acid solvent.

The requirement for effective catalysts by a soluble cobalt salt is met by the provision in the reaction mixture of cobalt acetate, propionate or butyrate or mixtures thereof in such amount as to correspond to 0.1 to 1%, preferably 0.3 to 0.6%, by weight of cobalt metal based on the weight of fatty acid solvent.

A further essential requirement in the presence as reaction activator of a methylenic ketone such as methyl ethyl ketone, methyl n-propyl ketone, diethyl ketone, 2,4-pentanedione and 2,5-hexanedione, methyl ethyl ketone being a preferred activator. The activator concentration should be at least about 1% and preferably in the range of 3 to 10% by weight of the fatty acid solvent. Higher concentrations may be advantageous at times, particularly in view of the fact that the activator is readily recovered for re-use from the reaction mixture. Concentrations up to about 50% to 75% by weight of the fatty acid solvent may be advisable in the presence of appreciable amounts of materials such as saturated liquid hydrocarbons or ethyl benzene which tend to slow down the desired oxidation reaction or when the starting methyl-aromatic compound contains nuclear substituents which exert a similar effect.

However, it has been found that operating within the above conditions is insufficient for securing rapid and efficient oxidation except with the additional provision of the proper content of water in the reaction mixture. The proper content of this essential ingredient is in the range of 1% to about 9% by weight of the reaction mixture and best results are obtained in the the preferred range of 3% to 7% of water by weight of the reaction mixture. Also, the sum of the concentrations of water and activator should be at least 4% to avoid a significant slowing down of the oxidation reaction.

In the above proportions, the combination of catalyst, fatty acid solvent and water coact to furnish optimum catalytic activity which is not available in the absence of any of the components in proper proportion. For example, in reaction mixtures as above specified except that the water content is less than 1% or greater than about 9%, high speed oxidation cannot be obtained and the conversion of more than half the starting methyl-aromatic compound to the desired carboxylic acid requires extended reaction periods of many hours up to several days.

The oxidation is effected by contacting the reaction mixture with a gas containing molecular oxygen at a partial pressure of oxygen amounting to from 100 to about 1,000 pounds per square inch, preferably in the range of about 400 to 700 pounds per square inch. The lower pressures are useful for the moderation of the oxidation reaction when a highly reactive starting material such as pure m-xylene or pure p-xylene is used or in the presence of high concentrations of activator and the higher pressures are advantageous in speeding up the reaction when that is desirable. While air or air enriched with oxygen may be used to advance, gaseous oxygen of commercial purity is preferred. Best results have been obtained at reaction temperatures of about 130° C., although excellent results are obtainable at reaction temperatures within the range of 125° C. to substantially 145° C.

Under the above conditions, the desired oxidation occurs very rapidly and an excellent extent of conversion to the desired aromatic carboxylic acid product is obtained generally in a few minutes. Such short reaction times have an added advantage in that a substantial proportion of the activator is recovered and can be recycled. In accordance with the preferred manner of operation, the reaction time is controlled so as not to exceed the period required for the desired oxidation of about 30% to 95% of the starting material. After the aromatic carboxylic acid product has been isolated, the reaction mixture residue can be readjusted to the proper composition and re-used for further oxidation. At times, it may likewise be advantageous to extent the reaction period to about an hour or two, higher conversions of starting material being then obtained at the expense of consumption of the activator reagent. It is noteworthy that in speed efficiency of the oxidation reaction, the process of this invention far surpasses the best prior art practice, for example the process described in U.S. application Serial Number 523,920, filed July 22, 1955, by William F. Brill, now U.S. 2,853,514, issued September 23, 1958, wherein the shortest total reaction time in the specific examples is 24 hours.

Likewise, the present invention eliminates or minimizes the induction period characteristic of prior proposals in this field. In the preferred mode of operation, chemicals recycled from previous operations are added to fresh chemicals and reacted in a batch or continuous process, and in such practice, an induction period of ten minutes or less is encountered.

The following specific examples provide illustrative embodiments of the oxidation of methyl-aromatic compounds to form aromatic carboxylic acids in accordance with this invention.

Example I

A solution of 314 parts by weight of glacial acetic acid, 27.6 parts of toluene (commercial grade), 21.6 parts of methyl ethyl ketone, and 7.5 parts of cobalt acetate tetrahydrate, the solution having a water content of 3.5% by weight, was charged into a stanless steel pressure reactor equipped with a temperature controller, stirrer and suitable inlet for the introduction of oxygen or air. The stirrer and heating were started and oxygen gas introduced to a pressure of 300 pounds per square inch gauge. As soon as the temperature reached 130° C., the oxygen pressure was increased to 500 p.s.i.g. Vigorous oxygen absorption started, and after 5 minutes the reaction was interrupted by rapid cooling and release of the oxygen pressure. The contents were subjected to fractional distillation using an efficient column, resulting in the recovery of 18.2 parts of methyl ethyl ketone and 3.5 parts of toluene.

The distillation residue was made alkaline by the addition of sodium hydroxide and the precipitated cobalt hydroxide was removed by filtration. The filtrate was acidified with hydrochloric acid and extracted with ether. The benzoic acid product was obtained on evaporating the solvent from the ether solution.

The isolated reaction product consisted of 22.5 parts by weight of pure benzoic acid (70.3% of theoretical yield) displaying a melting point of 121.0° to 121.5° and neutral equivalent of 122.0.

Example II

A solution of 314 parts by weight of glacial acetic acid, 42.2 parts of chloro-p-xylene, 21.6 parts of methyl ethyl ketone, and 7.5 parts of cobalt acetate tetrahydrate, the solution having a water content of 4% by weight, was charged into a stainless steel pressure reactor equipped with a temperature controller, stirrer and suitable inlet for the introduction of oxygen or air. The stirrer and heating were started and oxygen gas introduced to 300 p.s.i.g. As soon as the temperature reached 130° C. the oxygen pressure was increased to 500 p.s.i.g. Vigorous oxygen absorption started and, after 5 minutes, the reaction was interrupted by rapid cooling and release of the oxygen pressure. The contents were subjected to fractional distillation using an efficient column, and 13.2 parts by weight of methyl ethyl ketone were recovered.

The distillation residue was cooled to room temperature and the precipitated product was filtered, washed several times with hot water and dried. The product consisted of 45.0 parts by weight of chloroterephthalic acid of excellent quality, having neutral equivalent of 100.1–100.3, capable of yielding salts, esters and other derivatives of high purity.

The filtrate, containing the catalyst and chloro-p-toluic acid, was suitable for re-use in the oxidation process after restoration of the starting composition by the proper addition of water, acetic acid, and chloro-p-xylene. Such recycling of the reagents results in excellent product at higher than the 75% of theoretical yield obtained in the foregoing initial oxidation.

Examples III–VI

The following specific examples describe the production of terephthalic and isophthalic acids by the oxidation of a mixed xylene containing 50% m-xylene, 23% p-xylene, 6% o-xylene, 12% ethyl benzene and 9% saturated hydrocarbons. The reaction mixture consisting of a solution of 31.8 parts of the mixed xylene, 7.5 parts of cobaltous acetate tetrahydrate, and 21.6 parts (unless otherwise indicated) of methyl ethyl ketone in 314 parts of glacial acetic acid, all parts being by weight, was charged into a stainless steel pressure vessel equipped with a temperature controller, stirrer and suitable inlet for the introduction of gaseous oxygen or air.

The solution was heated during stirring and under an oxygen pressure of 300 pounds per square inch gauge; when the temperature reached 130° C., the oxygen pressure was increased to 500 p.s.i.g. Vigorous absorption of oxygen then ensued, accompanied by considerable evolution of heat, the oxygen pressure being maintained constant by means of a suitable control valve and the temperature being kept at about 130° C. by cooling the reaction vessel. After the reaction had proceeded under these conditions for the desired period, the reaction was stopped by rapid cooling of the vessel and contents and release of the oxygen pressure.

The solution was subjected to distillation at atmospheric pressure using an efficient fractionating column. The condensate from fractions boiling at 71°–78° C. and 78°–97° C. contained substantial proportions of methyl ethyl ketone (about 75% and 30–50% by weight, respectively) and was suitable for re-use, while the fraction boiling at 97°–100° C., consisting mainly of water with small amounts of the ketone and traces of xylenes, was discarded.

The residual solution was filtered hot (at about 100° C.) and the filter cake was washed seeveral times with hot water and dried. The product was a mixture of terephthalic and isophthalic acids, characterized by neutral equivalent of 83.0 to 84.1 and capable of conversion to colorless alkyl esters and thermoplastic polymers of glycol esters. When desired, the product may be treated to yield substantially pure terephthalic and isophthalic acids.

The filtrate was combined with the condensed fractions boiling at 71°–97° C. and sufficient mixed xylenes and methyl ethyl ketone to restore the above starting composition. The added xylene may be calculated as the amount equivalent to the product isolated in the previous oxidation and the additional ketone as the difference between the desired amount and that present in the returned condensed fractions. Also, the water concentration is determined in the solution, as by use of Karl Fischer reagent, and an amount is added, if necessary, to bring the concentration within 1% to 9%, preferably about 3% to 7%, by weight of the solution. Similar adjustments are likewise applicable to the initial solution, although generally sufficient water is present in the reagents, particularly the water of hydration in the crystalline cobalt salt and in the fatty acid, to provide over 1% by weight of the solution.

The solution was then ready for the oxidation which was carried out as described above and the cycle could be repeated. After each ten or fifteen cycles, the solution should be analyzed for cobalt salt content and any necessary addition made. Likewise, lower fatty acid may be added when required to bring the solution to the starting volume.

The following table summarizes results obtained under varied conditions.

| Example | Reaction Time, Minutes | Methyl Ethyl Ketone | | Recovered Iso-and Terephthalic Acid | Yield, Percent |
| --- | --- | --- | --- | --- | --- |
| | | Start | Recovered | | |
| III | 4 | [1] 21.6 | [1] 18.6 | [1] 18.8 | [2] 52 |
| IV | 10 | 21.6 | 15.3 | 33.0 | 91 |
| V | 15 | 10.8 | 7.8 | 21.8 | 60 |
| VI | 60 | 10.8 | trace | 34.0 | 94 |

[1] Parts by weight.
[2] Percent of theoretical.

*Example VII*

The procedure of Example IV was repeated nine times, with recycling of the residual solution and reagents recovered by distillation, as described above.

A total of 253.6 parts by weight of mixed xylenes yielded a total of 269.5 parts by weight of excellent mixed isophthalic-terephthalic acid product (93% of theoretical yield) and with the recovery of 80% by weight of the 162.0 parts by weight total methyl ethyl ketone added.

*Example VIII*

The procedure of Example V was repeated five more times, with recycling of the residual solution and reagents recovered by distillation, as described above.

A total of 106.4 parts by weight of excellent mixed isophthalic-terephthalic acid product (68% of theoretical yield) was obtained from 137.6 parts by weight of mixed xylenes. Actual conversion was higher, taking into account the isophthalic acid and toluic acids retained in the sixth cycle filtrate. Of the total 25.8 parts of methyl ethyl ketone used, 14.8 parts were recovered.

The benefits of the ready adaptability of the process of this invention to the recycling of solvent and reagents are particularly available when the oxidation is operated in continuous manner, to which the short duration of the reaction is especially adapted. In this mode of applying the process of the invention, the apparatus for continuous operation preferably includes in series a solution supply tank, preheater, reactor, distillation vessel with fractionating column, filter or centrifuge for isolating the carboxylic acid product, and connecting conduits.

Accordingly, this invention provides outstanding advantages, heretofore not available, for the oxidation of methyl-aromatic compounds to yield carboxylic acids of excellent properties. These are particularly applicable for the preparation of dibasic acids, as in the oxidation of mixed xylenes to form terephthalic and isophthalic acids, but the invention is not to be limited except in accordance with the appended claims.

We claim:

1. Process for preparing a benzene dicarboxylic acid selected from the group consisting of terephthalic and isophthalic acids comprising providing a solution of a methyl-substituted benzene selected from the group consisting of meta- and para-xylenes in a lower fatty acid having two to four carbon atoms containing about 2% to 20% of said methyl-substituted benzene by weight of said fatty acid, said solution having an initial content of about 1% to 9% by weight of water, and containing a cobalt salt of a lower fatty acid having 2–4 carbon atoms, in an amount corresponding to about 0.1% to 1.0% cobalt by weight of the fatty acid, and a methylenic ketone in an amount of about 3% to 10% by weight of the fatty acid, and contacting the said solution at a temperature of 125° C. to about 145° C. with gas containing molecular oxygen at a partial pressure of oxygen of about 100 to 1,000 pounds per square inch, and continuing the reaction for a period a few minutes to not more than about two hours until 30% to about 95% of the methyl-substituted benzene has been oxidized to a benzene dicarboxylic acid.

2. Process in accordance with claim 1, wherein the reaction temperature is about 130° C.

3. Process in accordance with claim 1, wherein the reaction mixture initially contains about 3% to 7% by weight of water.

4. Process in accordance with claim 1, wherein the reaction mixture initially contains about 7% to 12% of said methyl-substituted benzene by weight of said fatty acid.

5. Process for preparing a benzene dicarboxylic acid selected from the group consisting of terephthalic and isophthalic acids comprising providing a solution of a methyl-substituted benzene selected from the group consisting of meta- and para-xylenes in a lower fatty acid having two to four carbon atoms containing about 2% to 20% of said methyl-substituted benzene by weight of said fatty acid, said solution having an initial content of about 1% to 9% by weight of water, and containing a cobalt salt of a lower fatty acid having 2–4 carbon atoms, in an amount corresponding to about 0.1% to 1.0% cobalt by weight of the fatty acid, and a methylenic ketone in an amount of about 3% to 10% by weight of the fatty acid, and contacting the said solution at a temperature of 125° C. to about 145° C. with gas containing molecular oxygen at a partial pressure of oxygen of about 100 to 1,000 pounds per square inch, continuing the reaction for a period of a few minutes to not more than about two hours until 30% to about 95% of the methyl-substituted benzene has been oxidized to a benzene dicarboxylic acid, separating the said acid from the reaction solution, and adjusting the composition of the said solution within the aforesaid limits for recycling in the oxidation reaction.

References Cited in the file of this patent

UNITED STATES PATENTS

| | | |
|---|---|---|
| 1,902,550 | Forrest et al. | Mar. 21, 1933 |
| 2,245,528 | Loder | June 10, 1941 |
| 2,746,990 | Fortuin et al. | May 22, 1956 |
| 2,833,819 | Egbert et al. | May 6, 1958 |
| 2,853,514 | Brill | Sept. 23, 1958 |